United States Patent
Ejiri (10) Patent No.: US 6,997,209 B2
(45) Date of Patent: Feb. 14, 2006

(54) LOCKING DEVICE OF AN AIR-OPERATED NORMALLY-CLOSED VALVE FOR A GAS CYLINDER

(75) Inventor: Takashi Ejiri, Tokyo (JP)

(73) Assignee: Fujikura Rubber Ltd., Tokyo (JP)

( * ) Notice: Subject to any disclaimer, the term of this patent is extended or adjusted under 35 U.S.C. 154(b) by 202 days.

(21) Appl. No.: 10/725,751

(22) Filed: Dec. 2, 2003

(65) Prior Publication Data

US 2004/0107995 A1 Jun. 10, 2004

(30) Foreign Application Priority Data

Dec. 3, 2002 (JP) .............................. 2002-351726

(51) Int. Cl.
F16K 37/00 (2006.01)

(52) U.S. Cl. ...................... 137/556; 137/383; 137/557; 251/25; 251/90; 251/112

(58) Field of Classification Search ................ 137/556, 137/557, 383, 382, 556.3; 251/90, 112, 25
See application file for complete search history.

(56) References Cited

U.S. PATENT DOCUMENTS

| | | | |
|---|---|---|---|
| 1,879,397 A * | 9/1932 | Minor | ..................... 137/68.23 |
| 4,213,480 A * | 7/1980 | Orum et al. | ................. 137/556 |
| 4,699,355 A | 10/1987 | Tomlin et al. | |
| 4,763,690 A | 8/1988 | Martin | |
| 5,906,353 A | 5/1999 | Someya et al. | |
| 6,805,158 B1 * | 10/2004 | Ejiri | ........................... 137/557 |

FOREIGN PATENT DOCUMENTS

| | | |
|---|---|---|
| EP | 1 138 995 A2 | 10/2001 |
| GB | 2 152 585 A | 8/1985 |

* cited by examiner

Primary Examiner—A. Michael Chambers
(74) Attorney, Agent, or Firm—McCormick, Paulding & Huber LLP (57) ABSTRACT

A locking device of an air-operated normally-closed valve for a gas cylinder includes a housing; a piston assembly provided in the housing; a tapered axial member having an annular outer tapered surface and positioned coaxially with the piston assembly axis; a lock nut which is screw-engaged with the housing and coaxial with the tapered axial member; an annular inner tapered surface formed on an inner peripheral surface of the lock nut to correspond to the annular outer tapered surface; an intermediate cylinder member positioned between the annular outer and inner tapered surfaces; and a lock piece inserted into a radial through hole and contacting the annular outer and inner tapered surfaces. The lock nut can press the lock piece against the annular outer tapered surface via the annular inner tapered surface to lock the piston assembly by adjusting the lock nut with respect to the housing.

13 Claims, 7 Drawing Sheets

LOCKING DEVICE OF AN AIR-OPERATED NORMALLY-CLOSED VALVE FOR A GAS CYLINDER

CROSS REFENCE TO RELATED APPLICATION

The present application is related to and claims priority of the following co-pending application, namely, Japanese patent application number 2002-351726 filed on Dec. 3, 2002. The above-identified application is incorporated herein by reference in its entirety.

BACKGROUND OF THE INVENTION

1. Field of the Invention

The present invention relates to a locking device of an air-operated normally-closed valve for a gas cylinder. The preset invention further relates to such a locking device in which an indicating mechanism for indicating a valve opened state of the valve is incorporated.

2. Description of the Related Art

Gas cylinders having a high internal pressure (e.g., approximately over 200 kg/cm$^2$) are generally provided on a valve port thereof with a manual valve or an air-operated normally-closed valve. If a large shock is accidentally given to the air-operated normally-closed valve during transportation and the like, there is a possibility of the air-operated normally-closed valve being opened momentarily since, generally, the air-operated normally-closed valve is closed by spring force. A conventional locking device of the air-operated normally-closed valve for a gas cylinder is used to exert a mechanical locking force on a valve body positioned inside the valve port of the gas cylinder to prevent the air-operated normally-closed valve from being opened accidentally during transportation.

SUMMARY OF THE INVENTION

The present invention provides a small and simple locking device of an air-operated normally-closed valve for a gas cylinder.

The present invention provides such a locking device in which an indicating mechanism for indicating a valve opened state of the valve is incorporated. The indicating mechanism is used to indicate visually that the air-operated normally-closed valve is in the valve opened state, i.e., that the gas contained in the gas cylinder is in use.

According to an aspect of the present invention, a locking device of an air-operated normally-closed valve for a gas cylinder, the gas cylinder being provided with a valve port and a valve body which opens and closes the valve port, the locking device including a housing which can be detachably attached to the valve port of the gas cylinder; a piston assembly provided in the housing, the piston assembly being biased by a spring force to move the valve body in a direction to close the valve port when the housing is attached to the valve port; a tapered axial member positioned coaxially with an axis of the piston assembly on an opposite side of the valve port, the tapered axial member having an annular outer tapered surface which gradually reduces in diameter thereof in a direction away from the valve port; a lock nut which is screw-engaged with the housing to be coaxial with the tapered axial member; an annular inner tapered surface formed on an inner peripheral surface of the lock nut to correspond to the annular outer tapered surface; an intermediate cylinder member which is integral with the housing and positioned between the annular outer tapered surface and the annular inner tapered surface, the intermediate cylinder member having at least one radial through hole; and at least one lock piece which is inserted into the radial through hole to be freely movable therein, and contacts with the annular outer tapered surface and the annular inner tapered surface. The lock nut can press the lock piece against the annular outer tapered surface via the annular inner tapered surface to lock the piston assembly by changing an amount of screw engagement of the lock nut with the housing.

The locking device can further include a valve-opened-state indicating cylinder member which can move relative to the tapered axial member to project from the housing; and a spring for biasing the valve-opened-state indicating cylinder member in a direction to make the valve-opened-state indicating cylinder member embedded in the housing. The valve-opened-state indicating cylinder member is pressed by the tapered axial member which moves in a direction to open the valve body to project from the housing against a spring force of the spring.

It is desirable for the housing to include a pressure chamber for moving the piston assembly in a valve opening direction thereof against a biasing force which biases the piston assembly in a valve closing direction thereof, wherein compressed air is applied to the valve opening pressure chamber in order to move the piston assembly in the valve opening direction.

The locking device can further include a valve stem which is provided independently of the piston assembly, wherein the valve stem moves in the same direction as the piston assembly and acts on the valve body in the valve port; at least one valve stem roller member which is supported by the valve stem, and has an axis of rotation extending in a direction perpendicular to a direction of a sliding movement of the valve stem without intersecting an axis of the valve stem; a tapered surface portion provided on an end of the piston assembly adjacent to the valve stem; and at least one intermediate roller member mounted between the tapered surface portion of the piston assembly and the valve stem roller member, the intermediate roller member being in rolling engagement with the valve stem roller member and the tapered surface portion and having an axis of rotation extending parallel to the axis of rotation of the valve stem roller member. The tapered surface portion, the intermediate roller member and the valve stem roller member are arranged such that when the piston assembly is moved by a unit displacement toward the valve stem in order to move the valve stem toward a valve seat via the tapered surface portion, the intermediate roller member, and the valve stem roller member, the valve stem are moved by a displacement smaller than the unit displacement of the piston assembly.

The valve stem roller member can include a pair of valve stem roller members which are arranged in a rotationally symmetrical manner with respect to the axis of the valve stem, and the intermediate roller member can include a pair of intermediate roller members which are arranged in a rotationally symmetrical manner with respect to the axis of the valve stem.

It is desirable for the valve stem and the pair of valve stem roller members to constitute a valve stem assembly.

It is desirable for the valve stem to be coaxial to the piston assembly.

The tapered surface portion can include a conical surface portion.

The tapered surface portion can include a wedge-like surface portion having a pair of oblique flat surfaces.

It is desirable for the piston assembly to include an operation shaft which extends coaxially with the valve stem, wherein one end of the operation shaft is fixed to the tapered axial member, and the tapered surface portion is formed on another end of the operation shaft.

It is desirable for the valve-opened-state indicating cylinder member to project outwards from an outer end of the intermediate cylinder member when the valve body is disengaged from a valve seat.

The radial through holes formed on the intermediate cylinder member can include two radial through holes formed on radially opposite sides of the tapered axial member, and the lock piece can include two lock pieces which are inserted into the two radial through holes, respectively.

It is desirable for each of the two lock pieces to be in the form of a cut-out portion of a ring member.

The present disclosure relates to subject matter contained in Japanese Patent Application No.2002-351726 (filed on Dec. 3, 2002) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
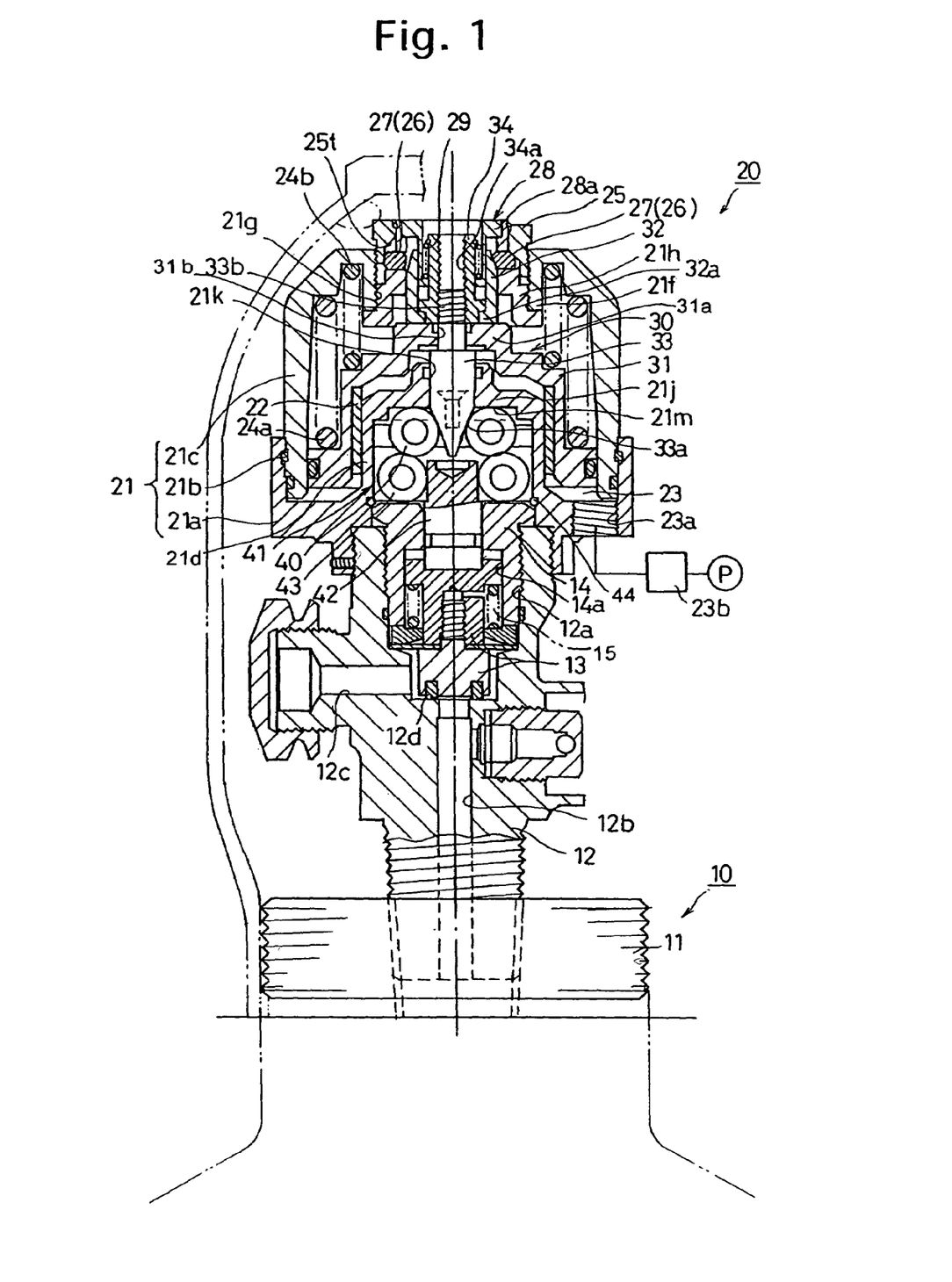
FIG. 1 is a longitudinal cross sectional view of an embodiment of an air-operated normally-closed valve for a gas cylinder, in which a locking device for locking the air-operated normally-closed valve is incorporated, showing a state where the air-operated normally-closed valve is fixed to a gas cylinder.

As shown in FIG. 1, a gas cylinder 10 is provided on top of a cylinder body 11 thereof with a valve port block 12 which is screwed into a top end of the cylinder body 11. The valve port block 12 is provided on top thereof with a valve port 12a, and is provided below the valve port 12a with an axial conduit 12b which is communicatively connected with the inside of the cylinder body 11 so that the valve port 12a and the inside of the cylinder body 11 are communicatively connected with each other via the axial conduit 12b. The internal diameter of the axial conduit 12b is smaller than that of the valve port 12a. The valve port block 12 is provided between the valve port 12a and the axial conduit 12b with a radial conduit (gas output port) 12c. The radial conduit 12c extends perpendicular to the axial conduit 12b, and is communicatively connected with the valve port 12a and the axial conduit 12b. The valve port block 12 is provided at a bottom of the valve port 12a with an annular valve seat 12d formed around the upper end of the axial conduit 12b. A threaded cylinder member 14 is screwed into the valve port 12a. A valve body 13 is fitted into the threaded cylinder member 14 from bottom thereof to be slidably movable with respect to the valve body 13 in directions to be engaged and disengaged with and from the annular valve seat 12d. The valve body 13 is biased in a direction away from the annular valve seat 12d by a compression coil spring 15. If the threaded cylinder member 14, which is screwed into the valve port 12a, is screwed down against the spring force of the compression coil spring 15, the valve body 13 is pressed down by a stepped hole 14a of the threaded cylinder member 14 to be seated on the annular valve seat 12d (i.e., the valve body 13 is closed).

An air-operated normally-closed valve 20 is mounted to the top of the valve port block 12. More specifically, a housing 21 of the air-operated normally-closed valve unit 20 is screwed on an upper end of the valve port block 12 to be fixed thereto. The housing 21 is provided with a bonnet 21a, a cylinder 21c and a lock ring 21b which connects the bonnet 21a and the cylinder 21c. The bonnet 21a is concentrically screwed on the upper end of the valve port block 12. A bottom portion of the cylinder 21c is fitted into the bonnet 21a to be fixed thereto by the lock ring 21b. FIGS. 2 through 6 show the normally-closed valve unit 20 in cross section in different operational states. FIG. 7 shows the normally-closed valve unit 20 in a disassembled state.

The bonnet 21a is provided at a center thereof with a small-diameter cylindrical portion 21d. The normally-closed valve unit 20 is provided with a piston assembly 30 which is fitted on the small-diameter cylindrical portion 21d. More specifically, a sliding bearing 22 is fitted on the small-diameter cylindrical portion 21d while a piston body 31 of the piston assembly 30 is fitted on the sliding bearing 22 so that the piston body 31 can move up and down freely with respect to the small-diameter cylindrical portion 21d. The normally-closed valve unit 20 is provided between the piston body 31 and the cylinder 21c with an outer-large compression spring 24a and an inner-small compression coil spring 24b which bias the piston body 31 downwards as viewed in FIG. 1 (in a valve-closing direction).

The normally-closed valve unit 20 is provided between the piston body 31 and the bonnet 21a with a valve opening pressure chamber 23. A pilot pressure (compressed air/working fluid) is applied to the valve opening pressure chamber 23 by a pilot pressure source P through an opening and closing control valve 23*b* and a pilot pressure introduction port (screw hole) 23*a* formed in the bonnet 21*a*.

The piston body 31 is in the shape of a cap, and is provided on top thereof with a disc portion 31*a*. The piston assembly 30 is provided immediately above the disc portion 31*a* with a tapered axial cylinder (tapered axial member) 32, and is provided immediately below the disc portion 31*a* with an operation shaft 33. The operation shaft 33 is provided with a screw shaft 33*b* which extends upwards as viewed in FIG. 1 to be positioned inside the tapered axial cylinder 32 through a bearing hole 31*b* formed at a center of the disc portion 31*a*. The normally-closed valve unit 20 is provided inside the tapered axial cylinder 32 with a hollow cylindrical retainer 34. The retainer 34 is inserted into the tapered axial cylinder 32 from the top thereof so that an outer flange 34*b* (see FIG. 2) formed on an outer peripheral surface of the retainer 34 is engaged with an inner flange 32*a* formed at a bottom of the tapered axial cylinder 32. The retainer 34 is provided with an axial screw hole 34*a* in which the screw shaft 33*b* is screw-engaged. The piston body 31, the tapered axial cylinder 32 and the operation shaft 33, which are elements of the piston assembly 30, are connected together as a unit due to the engagement of the axial screw hole 34*a* with the screw shaft 33*b*.

The cylinder 21*c* is provided at the top thereof with a top cylindrical portion 21*f*, an inner peripheral surface of which is threaded to be formed as a female thread portion 21*g*. An intermediate cylinder member 21*h* is screwed into the top cylindrical portion 21*f* from the bottom thereof to be fixed thereto so that the female thread portion 21*g* is engaged with a male thread portion formed on an outer peripheral surface of the intermediate cylinder member 21*h*. The intermediate cylinder member 21*h* is a stationary member which serves as an integral part of the housing 21. The tapered axial cylinder 32 is positioned inside the intermediate cylinder member 21*h* to be freely movable vertically as viewed in FIG. 1.

The normally-closed valve unit 20 is provided at the top thereof with a lock nut 25. The lock nut 25 is screwed into the top cylindrical portion 21*f* from top thereof to be fixed thereto so that the female thread portion 21*g* is engaged with a male thread portion formed on an outer peripheral surface of the lock nut 25 and so that a part of the lock nut 25 projects upwards from the top cylindrical portion 21*f*. The lock nut 25 is positioned around an upper end portion of the intermediate cylinder member 21*h*. Accordingly, this upper end portion of the intermediate cylinder member 21*h* is positioned between the tapered axial cylinder 32 and the lock nut 25. The intermediate cylinder member 21*h* is provided with a pair of radial through holes 26 into which a pair of movable lock pieces 27 are inserted to be freely movable radially in the pair of radial through holes 26, respectively.

Figure 4:
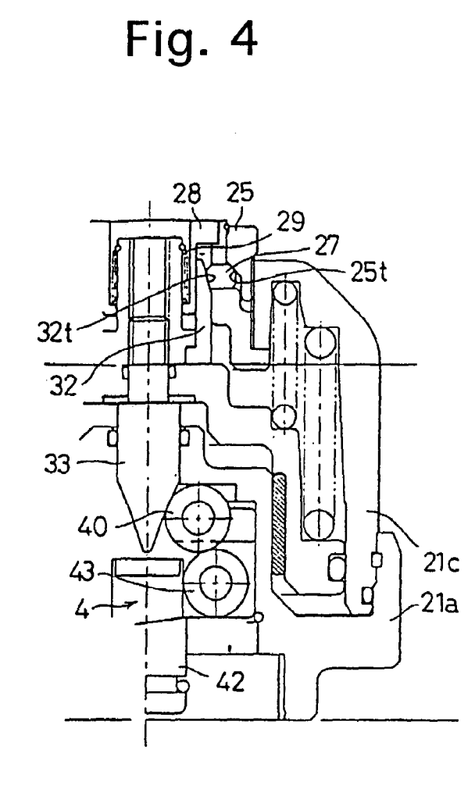
FIG. 4 is a view similar to that of FIG. 3, showing another operational state of the normally-closed valve unit which is different from the operational state shown in FIG. 2.
Figure 5:
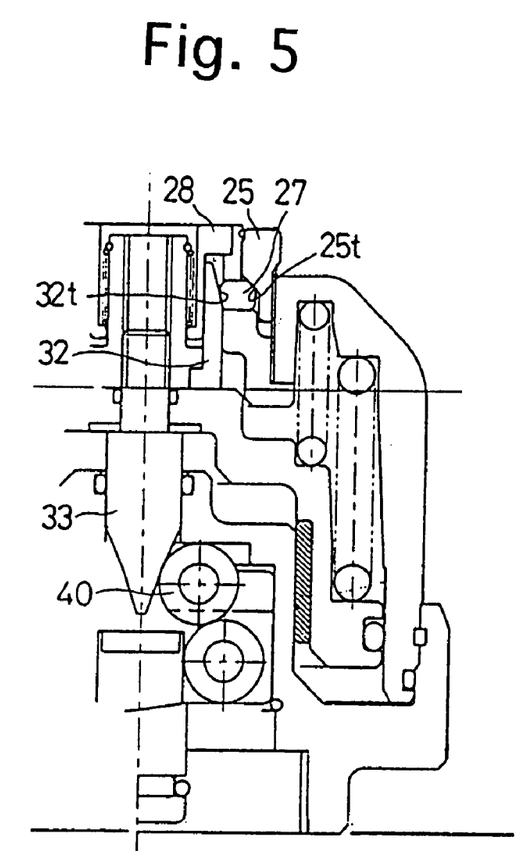
FIG. 5 is a view similar to that of FIG. 3, showing another operational state of the normally-closed valve unit which is different from the operational state shown in FIG. 2.
Figure 6:
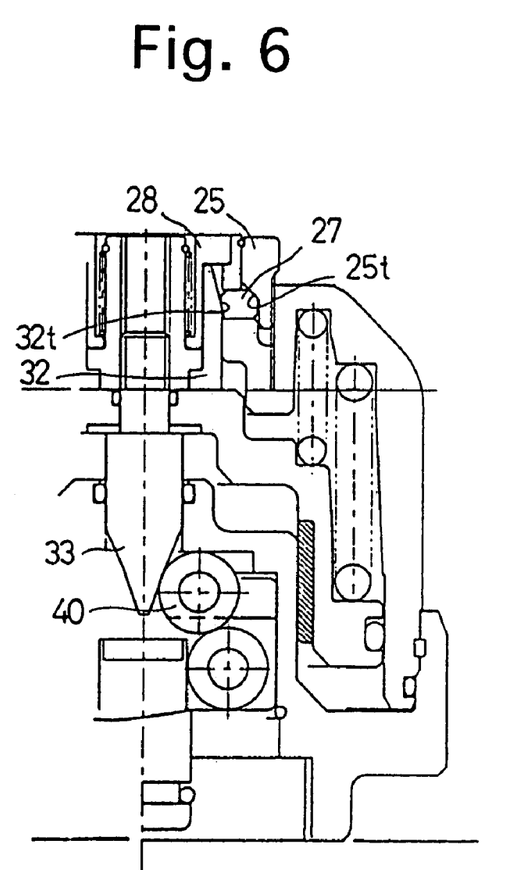
FIG. 6 is a view similar to that of FIG. 3, showing another operational state of the normally-closed valve unit which is different from the operational state shown in FIG. 2.
Figure 7:
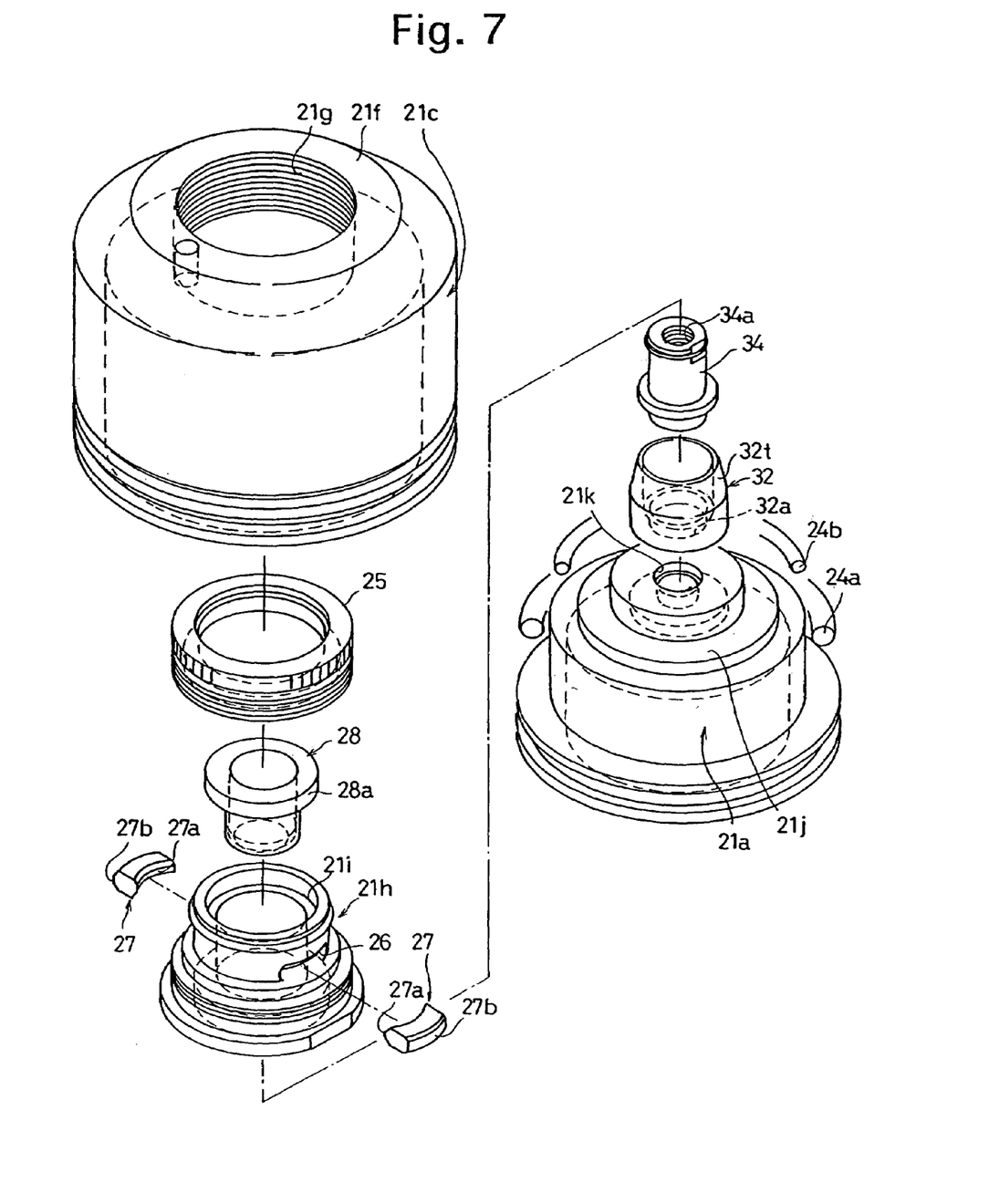
FIG. 7 is an exploded perspective view of elements of the normally-closed valve unit shown in FIG. 2.

The tapered axial cylinder 32 is provided at a tip thereof (an end opposite to the gas cylinder 10 side) with an annular outer tapered surface 32*t* which can contact the pair of movable lock pieces 27 and which tapers upwardly as viewed in FIGS. 4, 5 and 6. The lock nut 25 is provided on an inner peripheral surface thereof with an annular inner tapered surface 25*t* which can be in contact with the pair of movable lock pieces 27 and which tapers upwardly as viewed in FIGS. 4, 5 and 6. Namely, the annular outer tapered surface 32*t* and the annular inner tapered surface 25*t* taper in the same direction so that screwing the lock nut 25 down into the top cylindrical portion 21*f* (the female thread portion 21*g*) causes the annular inner tapered surface 25*t* to press the pair of movable lock pieces 27 radially inwards to bring the pair of movable lock pieces 27 into pressing contact with the annular outer tapered surface 32*t*.

Each movable lock piece 27 is in the form of a cut-out portion of a ring member having an appropriate length, as shown in FIG. 7. An inner lock surface 27*a* and an outer lock surface 27*b* of each movable lock piece 27 come in contact with the annular outer tapered surface 32*t* and the annular inner tapered surface 25*t*, respectively. By changing the amount of screw engagement of the lock nut 25 with respect to the top cylindrical portion 21*f* of the housing 21, the lock nut 25 either presses the pair of movable lock pieces 27 against the annular outer tapered surface 32*t* via the annular inner tapered surface 25*t* to lock the piston assembly 30 (to prevent the piston assembly 30 from moving in a valve opening direction) or does not press the pair of movable lock pieces 27 to make the piston assembly 30 free from the pressure from the pair of movable lock pieces 27. The piston assembly 30 can be locked with a stronger locking force than a typical piston assembly which has a pair of balls due to the pair of movable lock pieces 27.

The normally-closed valve unit 20 is provided on top thereof with a valve-opened-state indicating cylinder member 28 which is fitted on the retainer 34 to be freely slidable thereon. The valve-opened-state indicating cylinder member 28 is biased in a direction to be embedded in the intermediate cylinder member 21*h* (i.e., in the housing 21) by a compression coil spring 29 which is positioned between an outer peripheral surface of the retainer 34 and the valve-opened-state indicating cylinder member 28. The valve-opened-state indicating cylinder member 28 is provided at an outer end (upper end as viewed in FIG. 1) thereof with an outer flange 28*a* while the intermediate cylinder member 21*h* is provided at an upper end thereof with an annular recessed portion 21*i* (see FIGS. 2 and 3) into which the outer flange 28*a* can be fitted. This fit of the outer flange 28*a* into the annular recessed portion 21*i* determines the moving limit of the valve-opened-state indicating cylinder member 28 in the embedding direction into the intermediate cylinder member 21*h*. The upper end of the tapered axial cylinder 32 is positioned immediately below a bottom surface of the outer flange 28*a* of the valve-opened-state indicating cylinder member 28. Accordingly, if pilot pressure is applied to the valve opening pressure chamber 23 to move the piston assembly 30 upwards, the valve-opened-state indicating cylinder member 28 is moved upwards together with the piston assembly 30 by the tapered axial cylinder 32. Consequently, the outer flange 28*a* of the valve-opened-state indicating cylinder member 28 projects upwards from the annular recessed portion 21*i* of the intermediate cylinder member 21*h* to indicate that the valve body 13 is in a valve-opened state.

The piston assembly 30, which is biased in a direction to open the valve body 13, can be provided on an axis thereof with a valve stem which acts directly on the valve body 13 of the gas cylinder 10. However, in the present embodiment of the normally-closed valve unit 20, the piston assembly 30 is provided with a toggle mechanism for boosting operational force of the piston assembly 30 and transmitting the same to the valve body 13. This toggle mechanism corresponds to the toggle mechanism used for the toggle valve which has been proposed in Japanese Unexamined Patent Publication No.10-110856 (U.S. Pat. No. 5,906,353), the assignee of which is the same as that of the present invention.

Figure 10:
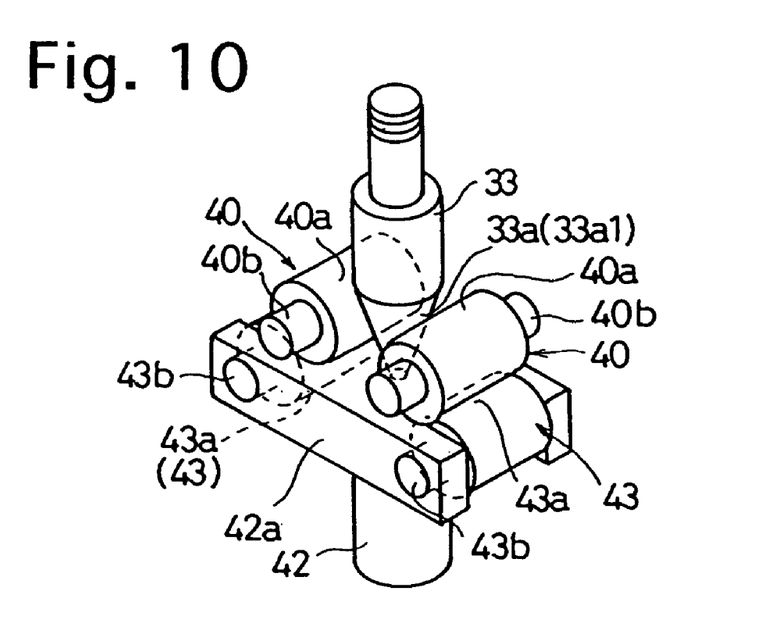
FIG. 10 is a perspective view of the intermediate roller members shown in FIG. 8 and an embodiment of a valve stem assembly of the normally-closed valve unit shown in FIG. 2.
Figure 11:
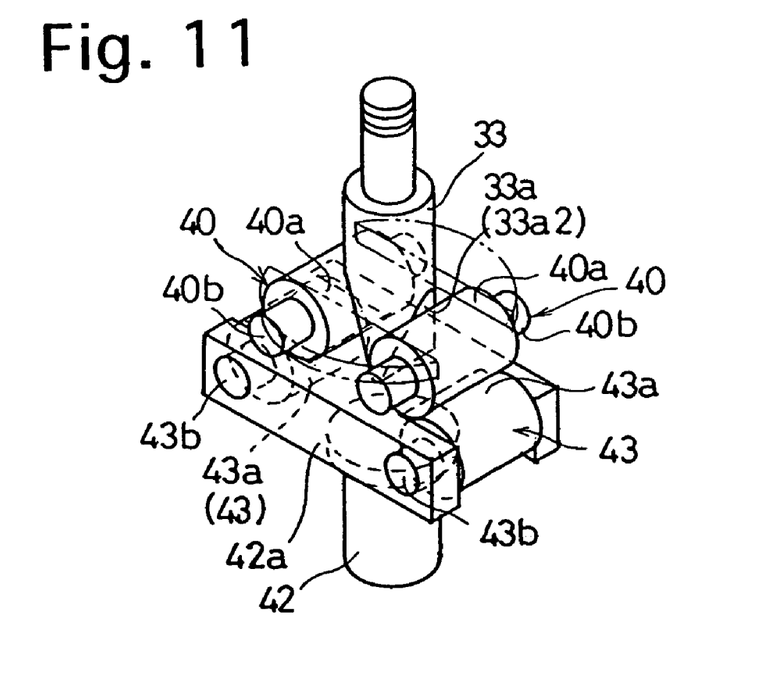
FIG. 11 is a perspective view of the intermediate roller members shown in FIG. 8 and another embodiment of the valve stem assembly of the normally-closed valve unit shown in FIG. 2.

The bonnet 21*a* is provided at a center thereof with a disc portion 21*j* which is integral with the upper end of the small-diameter cylindrical portion 21*d*. The disc portion 21*j* lies in a plane orthogonal to the axis of the operation shaft 33. The disc portion 21*j* is provided at a center thereof with an axial through hole 21*k*. The operation shaft 33 of the piston assembly 30 projects outwards from the bonnet 21*a* through the axial through hole 21*k*. The operation shaft 33 is provided at a lower end thereof with a tapered surface portion 33*a*. The tapered surface portion 33*a* can be formed as a conical surface portion 33*a*1 as shown in FIG. 10, or a wedge-like surface portion having a pair of oblique flat surfaces 33*a*2 as shown in FIG. 11.

Figure 2:
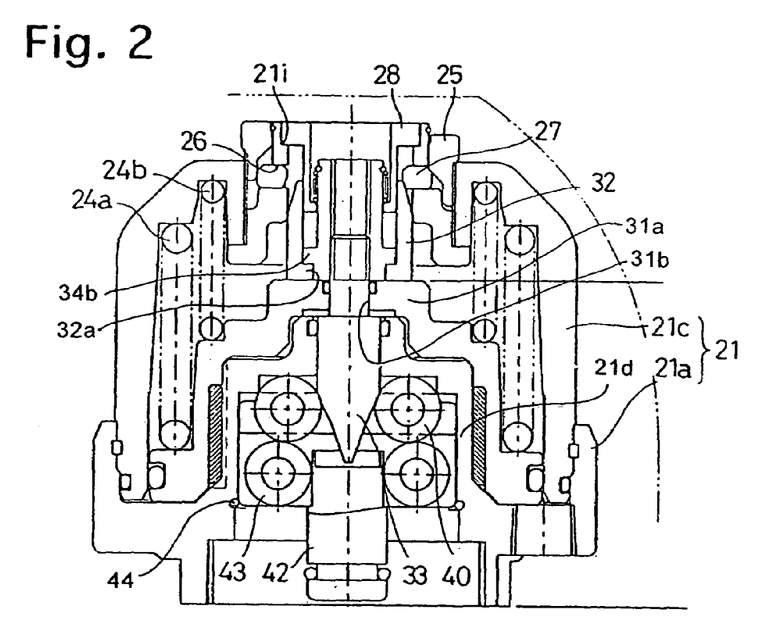
FIG. 2 is a longitudinal cross sectional view of the normally-closed valve unit shown in FIG. 1.
Figure 8:
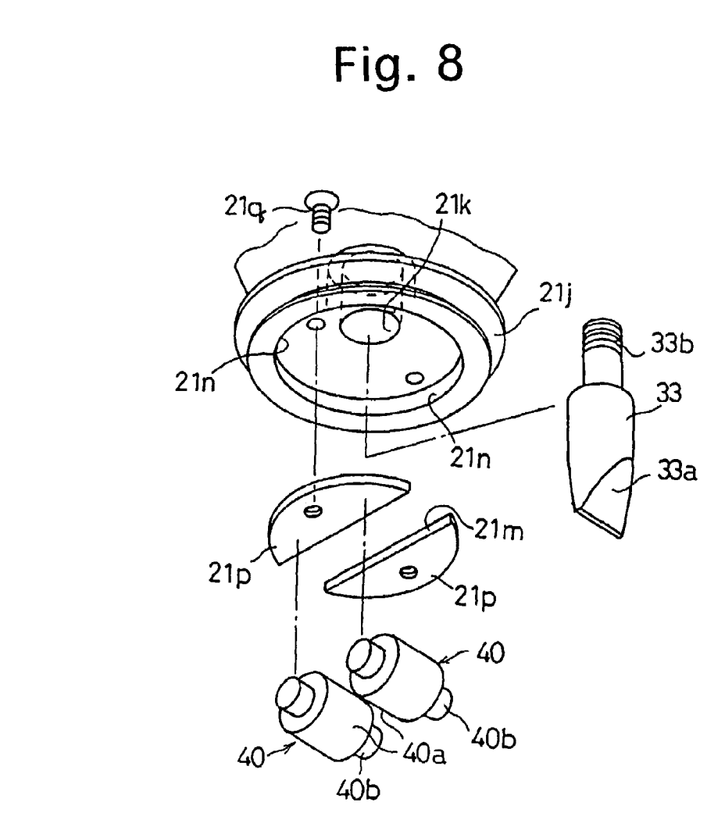
FIG. 8 is an exploded perspective view of elements of the normally-closed valve unit shown in FIG. 2, showing a structure guiding intermediate roller members of the normally-closed valve unit.
Figure 9:
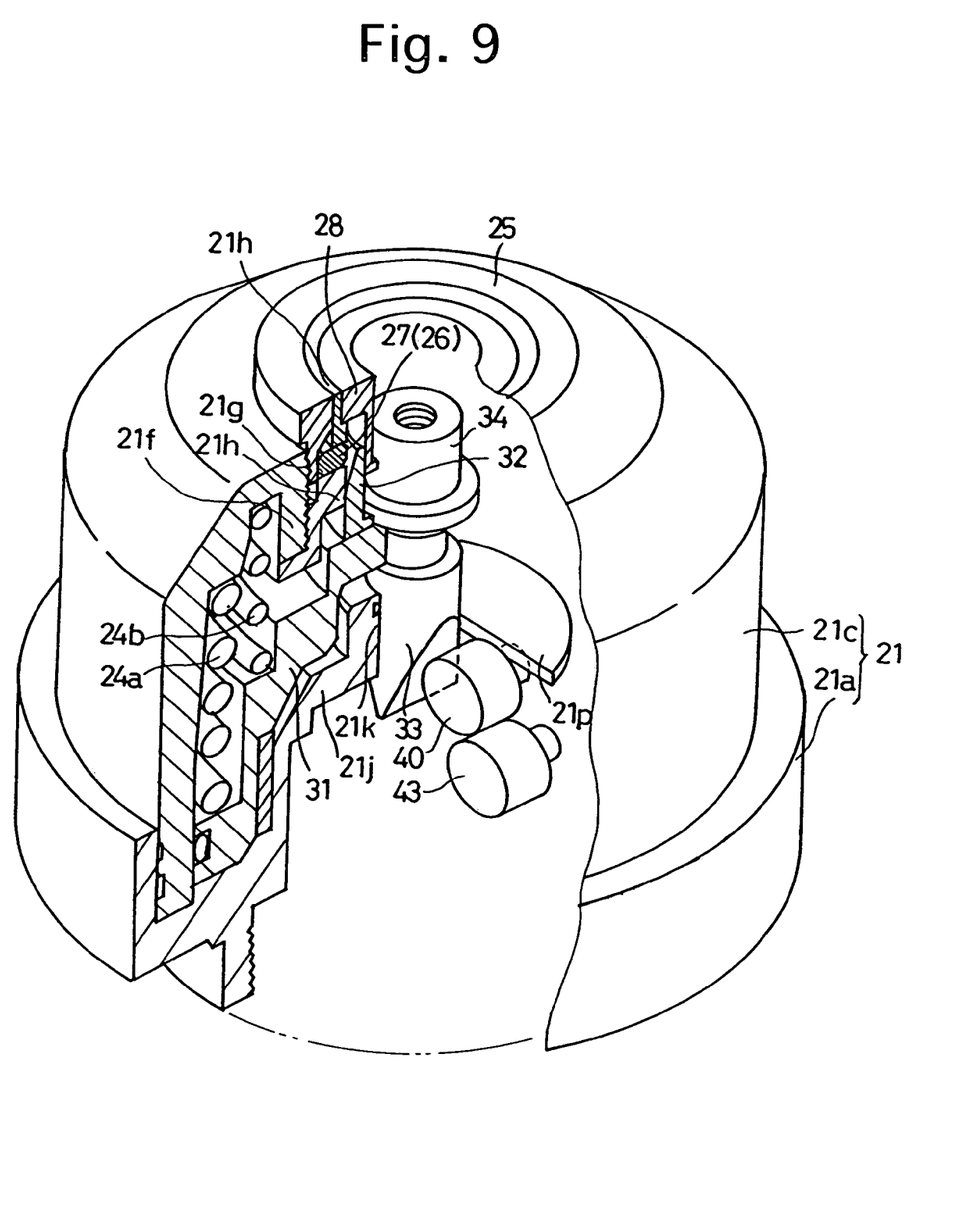
FIG. 9 is a perspective view, with parts broken away and in section, of the normally-closed valve unit shown in FIG. 2.

The normally-closed valve unit 20 is provided in the space surrounded by the small-diameter cylindrical portion 21*d* and the disc portion 21*j* with a pair of intermediate roller members (upper rollers members) 40 and a valve stem assembly 41 which are inserted into the space surrounded by the small-diameter cylindrical portion 21*d* to be supported thereby, in that order from top to bottom as viewed in FIGS. 1 and 2. Each of the pair of intermediate roller members 40 is made up of a roller 40*a* and an axial shaft 40*b*. Each roller 40*a* is positioned in a recess 21*m* (see FIG. 8) formed on a bottom surface of the disc portion 21*j* so as not to move in the axial direction of the associated axial shaft 40*b*. As shown in FIG. 8, the disc portion 21*j* is provided on a bottom surface thereof with a counterbore 21*n*, while a pair of semicircular plates 21*p* made of hard material are inserted into the counterbore 21*n* to be fixed to the disc portion 21*j* by two set screws 21*q* (only one of them is shown in FIG. 8), respectively. The recess 21*m*, in which the pair of rollers 40*a* are positioned, is formed between the pair of semicircular plates 21*p*. Each axial shaft 40*b* is guided along bottom surfaces of the pair of semicircular plates 21*p* (with each roller 40*a* being guided within the recess 21*m*) to be freely movable in a direction perpendicular to the axis of the operation shaft 33. This structure using the pair of semicircular plates 21*p* makes it possible to manufacture the bonnet 21*a* out of a relatively soft and low-cost material. In addition, each semicircular member 21*p* can be fixed to the disc portion 21*j* by a single set screw (i.e., the set screw 21*q*) since a circular arc edge of each semicircular member 21*p* fits snugly against an inner peripheral surface of the counterbore 21*n*.

The valve stem assembly 41 is provided with a valve stem 42 and a pair of valve stem roller members (lower roller members) 43. Each of the pair of valve stem roller members 43 is made up of a roller 43*a* and an axial shaft 43*b* whose opposite ends are supported by a support block 42*a* (see FIGS. 10 and 11). The valve stem 42 is integral with the support block 42*a*. The support block 42*a* lies in a plane orthogonal to the axis of the valve stem 42. The pair of valve stem roller members 43 (the pair of axial shafts 43*b*) are arranged at opposite sides of the axis of the valve stem 42 in a rotationally symmetrical manner with respect to the axis of the valve stem 42 to extend parallel to each other in a direction perpendicular to the axis of the valve stem 42 without intersecting the axis of the valve stem 42. The lower end of the valve stem 42 is in contact with an upper surface of the valve body 13 in a state where the normally-closed valve unit 20 is fixed to the gas cylinder 10.

The pair of intermediate roller members 40 are parallel to the pair of valve stem roller members 43 and are provided between the tapered surface portion 33*a* and the pair of valve stem roller members 43. The valve-closing pressure which is exerted on the piston assembly 30 via the outer-large compression spring 24*a* and the inner-small compression coil spring 24*b* is transmitted to the valve stem 42 via the tapered surface portion 33*a*, the pair of intermediate roller members 40 and the pair of valve stem roller members 43. The pair of intermediate roller members 40 and the valve stem assembly 41 are prevented from coming out of the space inside the small-diameter cylindrical portion 21*d* by an O-ring 44 which is fitted into an annular groove which is formed on an inner peripheral surface of the small-diameter cylindrical portion 21*d* in the vicinity of the bottom opening thereof.

The taper angle of the tapered surface portion 33*a* of the operation shaft 33 and the outer diameters and the initial positions of the pair of intermediate roller members 40 and the pair of valve stem roller members 43 (i.e. the positions when the normally-closed valve unit 20 is removed from the gas cylinder 10) are determined as follows. Namely, when the piston assembly 30 is moved toward the valve stem assembly 41 by a unit displacement (subsequently moving the valve stem 42 toward the valve body 13 through the tapered surface portion 33*a*, the pair of intermediate roller members 40 and the pair of valve stem roller members 43), the valve stem 42 is moved by a displacement smaller than the unit displacement of the piston assembly 30. In an embodiment, for instance, "axial displacement of the piston assembly 30":"axial displacement of the valve stem 42"=1: 0.2 or 1:0.1. In any operational state, the pair of intermediate roller members 40 are in contact with the tapered surface 33*a* and the pair of valve stem roller members 43, and when the piston assembly 30 is moved to the lowermost position toward the valve stem assembly 41, the axes of the pair of intermediate roller members 40 are never located radially outside the axes of the valve stem roller members 43 in a radial direction of the valve stem 42, respectively.

In the above illustrated embodiment of the normally-closed valve unit 20, the valve stem 42 comes into contact with the valve body 13 to lock the valve body 13 mechanically when the bonnet 21*a* of the housing 21 is screwed on the valve port block 12.

Figure 3:
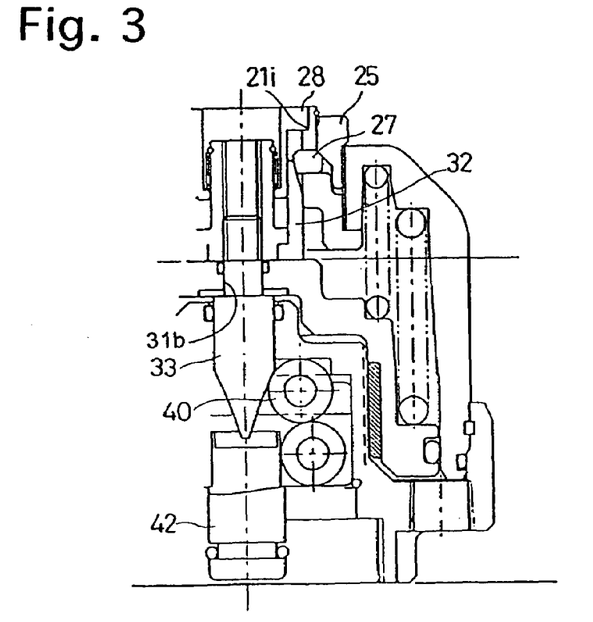
FIG. 3 is a longitudinal cross sectional view, partly omitted, of the normally-closed valve unit shown in FIG. 1, showing an operational state thereof different from the operational state shown in FIG. 2.

Although the position of the valve body 13 in the valve port block 12 of the gas cylinder 10 varies depending on the valve port block the gas cylinder used, the initial position of the valve stem 42 does not have to be adjusted in accordance with the gas cylinder to which the normally-closed valve unit 20 is fixed. Namely, variations of the initial position of the valve stem 42 can be adjusted by adjusting the relative dimensions between the tapered axial cylinder 32 and the valve-opened-state indicating cylinder member 28, the angles of radially inner and outer contacting surfaces of each movable lock piece 27, the angle of the annular inner tapered surface 25*t* and the angle of the annular outer tapered surface 32*t*. Even if the position of screw engagement of the lock nut 25 changes with respect to the female thread portion 21*g* of the top cylindrical portion 21*f*, the piston assembly 30 can be locked by the annular inner tapered surface 25*t* in a range where the pair of movable lock pieces 27 are engaged with the annular outer tapered surface 32*t*. Changing the position of screw engagement of the lock nut 25 with respect to the female thread portion 21*g* of the top cylindrical portion 21*f* causes the distance between the tip of the tapered axial cylinder 32, which is integral with the piston assembly 30, and the outer flange 28*a* of the valve-opened-state indicating cylinder member 28 to change. FIGS. 3 through 5 show the piston assembly 30 in different positions with the lock nut 25 being positioned in different rotational positions, respectively.

Even if the position of screw engagement of the lock nut 25 is adjusted with respect to the female thread portion 21*g* of the top cylindrical portion 21*f*, the outer flange 28*a* of the valve-opened-state indicating cylinder member 28, which is biased in a direction to be embedded in the intermediate cylinder member 21*h* by the compression coil spring 29, remains in the annular recessed portion 21i of the intermediate cylinder member 21h, so that the valve-opened-state indicating cylinder member 28 does not indicate a valve opened state.

In this state, the combined spring force of the outer-large compression spring 24a and the inner-small compression coil spring 24b is boosted to be transmitted to the valve body 13, so that a large closing force is obtained. Namely, the valve closing force exerted on the piston assembly 30 is transmitted to the valve stem 42 via the tapered surface portion 33a of the operation shaft 33, the pair of intermediate roller members 40 and the valve stem assembly 41.

Since the displacement of the valve stem 42 is smaller than the unit displacement of the piston assembly 30 when the valve closing force of the piston assembly 30 is transmitted to the valve stem 42 through the tapered surface portion 33a, the pair of intermediate roller members 40 and the valve stem assembly 41, it is possible to obtain a strong valve closing force by a small spring force from the outer-large compression spring 24a and the inner-small compression coil spring 24b. In the particular embodiment described above, a valve closing force five or ten times the combined spring force of the outer-large compression spring 24a and the inner-small compression coil spring 24b is obtained.

To open the valve, the opening and closing control valve 23b is opened to introduce the pilot pressure from the pilot pressure source P into the valve opening chamber 23 through the pilot pressure introduction port 23a. When the pilot pressure exceeds the combined spring force of the outer-large compression spring 24a and the inner-small compression coil spring 24b, upward movement of the piston assembly 30 occurs, and subsequently, the force to retain the valve body 13 in the closed position counteracted. Hence, the gas contained in the gas cylinder 10 is discharged therefrom through the radial conduit (gas output port) 12c.

Such upward movement of the piston assembly 30 in a valve opening direction causes the upper end of the tapered axial cylinder 32 to come into contact with the bottom surface of the outer flange 28a of the valve-opened-state indicating cylinder member 28 and to lift the valve-opened-state indicating cylinder member 28 together with the piston assembly 30, i.e., to make the valve-opened-state indicating cylinder member 28 project upwards from the housing 21 to indicate that the valve body 13 is in a valve opened state. It is desirable that an outer peripheral surface of an upper end portion of the valve-opened-state indicating cylinder member 28 be colored an eye-catching color.

Although a toggle mechanism is provided between the piston assembly 30 and the valve body 13 in the above illustrated embodiment of the air-operated normally-closed valve for gas cylinder, the piston assembly 30 can be modified to act directly on the valve body 13 of the gas cylinder 10 as has been described above.

As can be understood from the foregoing, according to the present invention, a small and simple locking device of an air-operated normally-closed valve for a gas cylinder is achieved. Moreover, such a locking device is achieved in which an indicating mechanism for indicating a valve opened state of the valve is incorporated.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A locking device of an air-operated normally-closed valve for a gas cylinder, said gas cylinder being provided with a valve port and a valve body which opens and closes said valve port, said locking device comprising:
   a housing which can be detachably attached to said valve port of said gas cylinder;
   a piston assembly provided in said housing, said piston assembly being biased by a spring force to move said valve body in a direction to close said valve port when said housing is attached to said valve port;
   a tapered axial member positioned coaxially with an axis of said piston assembly on an opposite side of said valve port, said tapered axial member having an annular outer tapered surface which gradually reduces in diameter thereof in a direction away from said valve port;
   a lock nut which is screw-engaged with said housing to be coaxial with said tapered axial member;
   an annular inner tapered surface formed on an inner peripheral surface of said lock nut to correspond to said annular outer tapered surface;
   an intermediate cylinder member which is integral with said housing and positioned between said annular outer tapered surface and said annular inner tapered surface, said intermediate cylinder member having at least one radial through hole; and
   at least one lock piece which is inserted into said radial through hole to be freely movable therein, and contacts with said annular outer tapered surface and said annular inner tapered surface,
   wherein said lock nut can press said lock piece against said annular outer tapered surface via said annular inner tapered surface to lock said piston assembly by changing an amount of screw engagement of said lock nut with said housing.

2. The locking device according to claim 1, further comprising:
   a valve-opened-state indicating cylinder member which can move relative to said tapered axial member to project from said housing; and
   a spring for biasing said valve-opened-state indicating cylinder member in a direction to make said valve-opened-state indicating cylinder member embedded in said housing,
   wherein said valve-opened-state indicating cylinder member is pressed by said tapered axial member which moves in a direction to open said valve body to project from said housing against a spring force of said spring.

3. The locking device according to claim 1, wherein said housing comprises a pressure chamber for moving said piston assembly in a valve opening direction thereof against a biasing force which biases said piston assembly in a valve closing direction thereof, wherein compressed air is applied to said valve opening pressure chamber in order to move said piston assembly in said valve opening direction.

4. The locking device according to claim 1, further comprising:
   a valve stem which is provided independently of said piston assembly, wherein said valve stem moves in the same direction as said piston assembly and acts on said valve body in said valve port;
   at least one valve stem roller member which is supported by said valve stem, and has an axis of rotation extending in a direction perpendicular to a direction of a sliding movement of said valve stem without intersecting an axis of said valve stem;

a tapered surface portion provided on an end of said piston assembly adjacent to said valve stem; and at least one intermediate roller member mounted between said tapered surface portion of said piston assembly and said valve stem roller member, said intermediate roller member being in rolling engagement with said valve stem roller member and said tapered surface portion and having an axis of rotation extending parallel to said axis of rotation of said valve stem roller member, wherein said tapered surface portion, said intermediate roller member and said valve stem roller member are arranged such that when said piston assembly is moved by a unit displacement toward said valve stem in order to move said valve stem toward a valve seat via said tapered surface portion, said intermediate roller member, and said valve stem roller member, said valve stem are moved by a displacement smaller than said unit displacement of said piston assembly.

5. The locking device according to claim 4, wherein said valve stem roller member comprises a pair of valve stem roller members which are arranged in a rotationally symmetrical manner with respect to said axis of said valve stem, and wherein said intermediate roller member comprises a pair of intermediate roller members which are arranged in a rotationally symmetrical manner with respect to said axis of said valve stem.

6. The locking device according to claim 5, wherein said valve stem and said pair of valve stem roller members constitute a valve stem assembly.

7. The locking device according to claim 4, wherein said valve stem is coaxial to said piston assembly.

8. The locking device according to claim 4, wherein said tapered surface portion comprises a conical surface portion.

9. The locking device according to claim 4, wherein said tapered surface portion comprises a wedge-like surface portion having a pair of oblique flat surfaces.

10. The locking device according to claim 4, wherein said piston assembly comprises an operation shaft which extends coaxially with said valve stem, wherein one end of said operation shaft is fixed to said tapered axial member, and wherein said tapered surface portion is formed on another end of said operation shaft.

11. The locking device according to claim 2, wherein said valve-opened-state indicating cylinder member projects outwards from an outer end of said intermediate cylinder member when said valve body is disengaged from a valve seat.

12. The locking device according to claim 1, wherein said radial through holes formed on said intermediate cylinder member comprises two radial through holes formed on radially opposite sides of said tapered axial member, and wherein said lock piece comprises two lock pieces which are inserted into said two radial through holes, respectively.

13. The locking device according to claim 12, wherein each of said two lock pieces is in the form of a cut-out portion of a ring member.

* * * * *